United States Patent Office 2,698,770
Patented Jan. 4, 1955

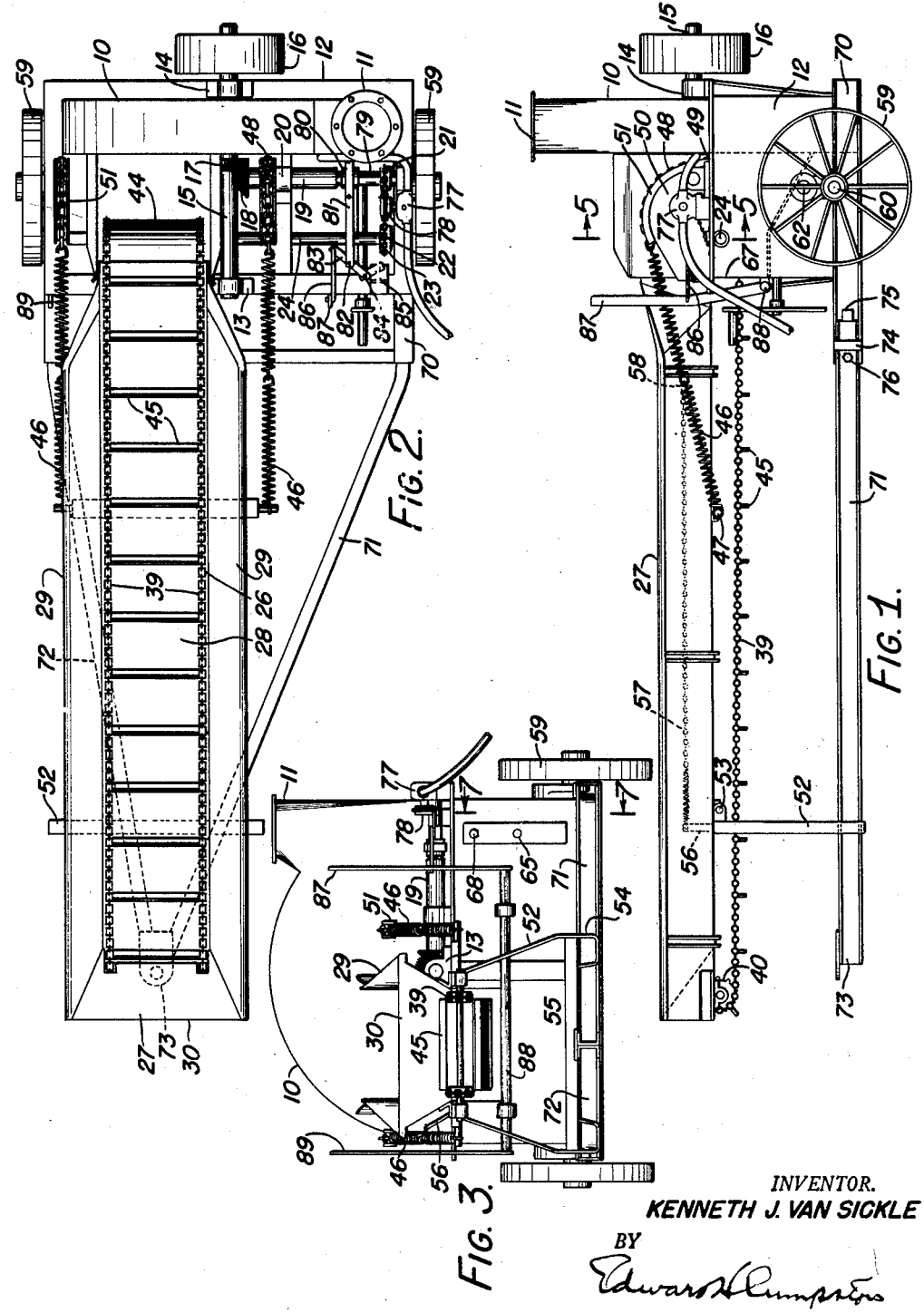

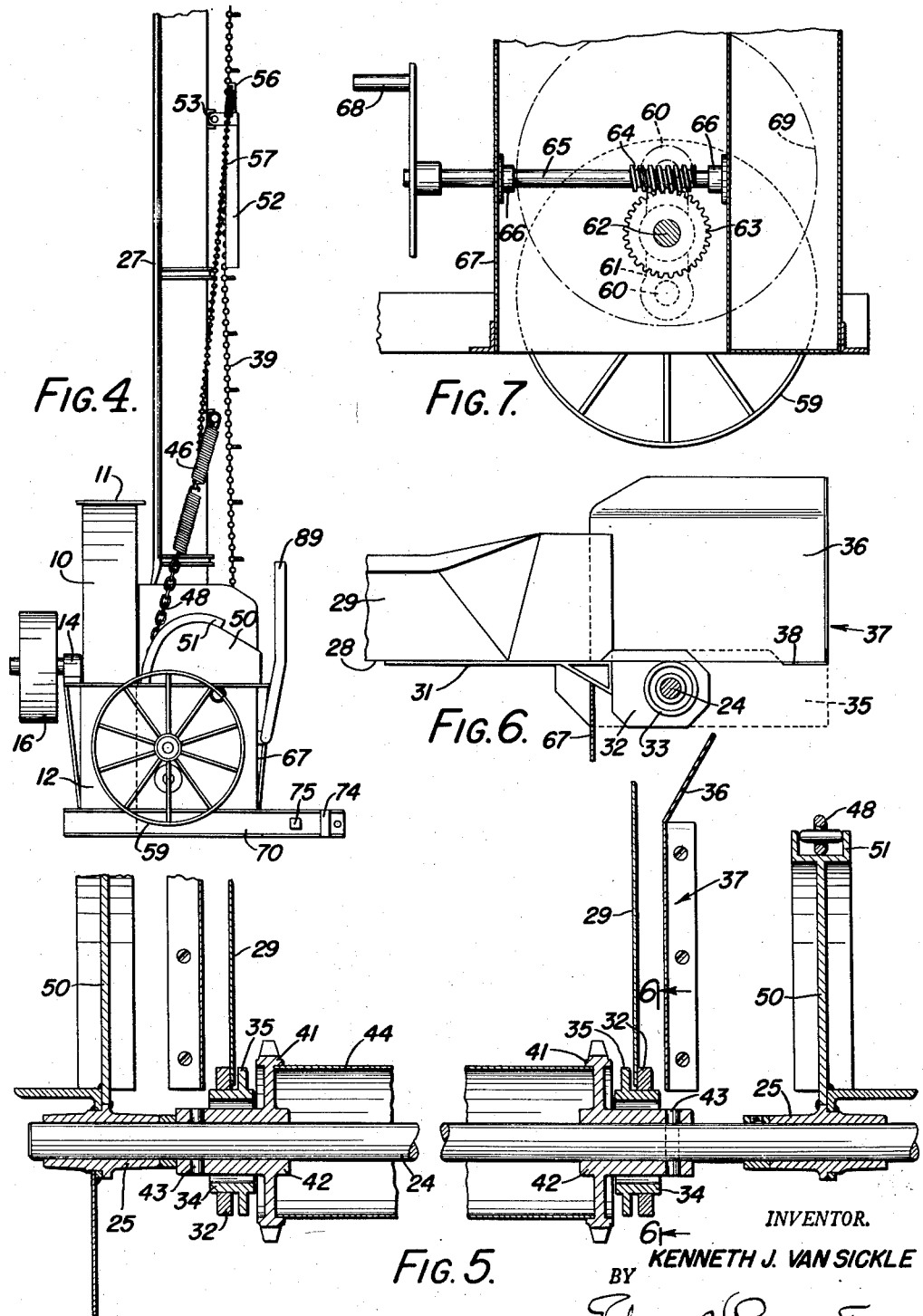

2,698,770

CROP BLOWER

Kenneth J. Van Sickle, Shortsville, N. Y., assignor to Papec Machine Company, Shortsville, N. Y., a corporation of New York Application September 14, 1949, Serial No. 115,669

7 Claims. (Cl. 302—37)

This invention relates to crop or forage blowers of the variety including a feed table or trough movably mounted on the blower frame to swing between a lowered crop receiving position and an upright retracted position, one object of the invention being to provide an improved machine of this character having a more efficient, practical and convenient construction.

Another object is to provide such a machine with means for efficiently counterbalancing the weight of the feed trough, so that it may be readily moved to its different positions by hand and retained stationarily in any position to which it may be adjusted.

Another object is the provision of such a crop blower having means by which its ground wheels may be quickly and conveniently raised and lowered for either resting the blower frame on the ground in lowered position during operation, or for supporting it on its ground wheels for transportation.

A further object is to provide a crop blower having the above advantages in a simple and practical type of construction capable of being economically manufactured and conveniently transported and operated while in use.

To these and other ends the invention resides in certain improvements and combination of parts, all as will be hereinafter more fully described, the novel features being pointed out in the claims at the end of the specification.

In the drawings:

Fig. 1 is a side elevation of a crop blower embodying the present invention and shown with its feed trough swung downwardly and its wheels in ground engaging position;

Fig. 2 is a top plan view thereof;

Fig. 3 is an end elevation as seen from the left in Figs. 1 and 2;

Fig. 4 is a side elevation showing the feed trough and wheels raised;

Fig. 5 is an enlarged, sectional elevation, partly broken away, on the line 5—5 in Fig. 1 and showing the mounting of the feed trough and its conveyor;

Fig. 6 is an enlarged, sectional elevation on the line 6—6 in Fig. 5, and

Fig. 7 is an enlarged, sectional elevation on the line 7—7 in Fig. 3 and showing the means for raising and lowering the ground wheels.

The invention is embodied in the present instance, by way of illustration, in a crop or forage blower, preferably of the type comprising a casing 10 (Figs. 1 and 2) for the usual fan rotor and a discharge duct 11 for the connection of the usual blower pipe (not shown) for elevating and discharging crop to a silo or other receiving space. The blower is mounted on the rear end of a substantially rectangular frame, indicated generally at 12, having spaced bearings, 13 and 14, mounted on its front and rear walls, respectively, for a main drive shaft 15. The outer end of the shaft at the rear of the frame has fixed thereon a pulley 16 for driving the moving parts of the machine from any suitable source of power. The shaft is connected by bevel gears, 17 and 18, with a transversely extending shaft 19 journalled at its ends in bearings as 20 on the frame. Fixed at the other end of shaft 19 is a sprocket wheel 21 connected by a sprocket chain 22 with a sprocket 23 fixed on a transverse shaft 24 rotatably supported at its ends in bearings 25 (Fig. 5), on the side walls of the frame. Shaft 24 drives a conveyor 26, as hereafter referred to, in a feed trough indicated generally at 27 and which will now be described.

The feed table or trough 27 extends forwardly from the front of the frame 12, as shown, and is elongated to extend across the rear end of a forage rack in position to receive the forage discharged therefrom. The trough has a substantially flat bottom 28 with upwardly inclined side walls 29 and an outer end wall 30. The inner end of the trough carries brackets 31 (Fig. 6), each fixed to a plate 32 having therein a bearing opening 33 fitting over a tubular trough bearing 34 projecting outwardly from a plate portion 35 on the frame. Each bearing 34 is arranged concentrically about shaft 24 and spaced therefrom, and it is evident from this construction that the trough has its inner end pivotally mounted on the frame for swinging movement between the lowered crop receiving position shown in Fig. 1 and the substantially upright retracted position shown in Fig. 4. The inner end of the trough has its sides fitting within the forwardly extending sides 36 of an apron, indicated generally at 37, extending forwardly of the casing 10 of the blower at opposite sides of the feed throat thereof. In lowered position, the bottom 28 of the trough is substantially level with the bottom 38 of the apron which is positioned at the proper elevation for feeding the crop into the throat of the blower, as well understood in the art.

The trough is provided with a conveyor comprising spaced endless chains 39 carried by a pair of sprockets 40 mounted in bearings on the bottom of the outer end of the trough (Fig. 1), as shown, and the chains are carried at the inner end of the trough by a pair of sprockets 41 fixedly connected with hubs 42 pinned as at 43 to shaft 24, so that rotation of the shaft rotates the sprockets and drives the conveyor chains which pass through openings in the ends of the trough. A drum 44 (Fig. 5) is mounted on and connects the sprockets. The chains are connected at spaced intervals by slats 45, which are moved by the chains over the bottom of the trough and push the crop along into apron 37 and the feed throat of the blower.

The feed trough is thus pivoted at its inner end concentrically with the sprocket wheels which drive its conveyor, so that the trough may be raised and lowered as referred to above, without affecting the conveyor, and it is evident that the trough is mounted for such pivotal movement on bearings on the frame, independently of any contact with the shaft 24 or its parts, so that there is no tendency of the shaft to move the trough and no frictional engagement of the shaft with the trough to impose a drag on the rotation of the shaft.

Means are provided for counterbalancing the weight of the trough as it is swung downwardly to its lowered crop receiving position, comprising a coiled tension spring 46 at each of its sides and having one end connected to a bracket 47 on the bottom of the trough intermediate its ends. The opposite end of each spring 46 is connected to a flexible element or chain 48 (Figs. 1 and 4), having its other end 49 fixed in any suitable manner to the frame at a point in rear of the shaft 24 about which the trough is pivotally moved. Such an arrangement tends to counterbalance the weight of the trough as it is swung downwardly to positions in which its weight acquires a torque component about its pivotal mounting. Such an arrangement, however, fails to effect a sufficient extension and increase of tension in the springs 46 to satisfactorily compensate for the increasing torque of the trough as it is swung to lowered position. It is found that this difficulty may be satisfactorily solved by providing a compensating means for progressively varying the tension of the spring as the trough is swung from one position to another comprising, preferably, at the end of each spring, a plate 50 (Figs. 1 and 5), fixed on and extending upwardly from the frame. The plate is provided with a curved, channel-shaped periphery 51 which receives and supports the chain, and these supporting channels are so shaped or curved as to progressively vary the tension of the springs in the different positions of the trough, so that it may be readily moved by hand from one position to another and maintained in any position of adjustment by the normal frictional engagement of the parts. The feed trough may thus be easily lifted by the operator from the lowered position shown in Fig. 1 to the upright position shown in Fig. 4, to allow a forage rack to be pulled to its unloading position, after which the operator may readily lower the trough in position to receive the discharge from the forage rack, as shown in Fig. 1.

The feed trough is preferably provided adjacent its outer end with supporting strut means 52 (Figs. 1 and 3), in the form of a bail-shaped support having the upper ends of its side arms pivoted at 53 on the sides of the trough. The bail has at each of its lower outer corners a foot portion 54 and these are connected across the bail by a brace 55 to provide a light but rigid structure. The bail has at the upper end of one or both of its side arms an extension 56 connected by a chain 57 to an intermediate point 58 of the corresponding counterbalancing spring 46, and it is evident from this arrangement that as the trough is lowered and its springs extended, a pull is exerted on chain 57 to swing the supporting strut 52 to its vertical position for supporting the outer end of the trough on the ground when the frame is lowered into contact with the ground. As the trough is raised to the position shown in Fig. 4, the weight of the strut swings it automatically to the vertical, out-of-the-way position shown.

The opposite sides of frame 12 are provided with ground wheels 59, each mounted on a trunnion 60 (Figs. 1 and 7), on the outer end of an arm 61 fixed on a rock shaft 62 extending transversely of the frame and mounted in bearings (not shown) in its side walls. This shaft has fixed thereon between the wheels a worm gear 63 meshing with a worm 64 on a shaft 65 rotatably supported in bearings 66 on wall portions of the frame. The shaft extends through the front wall 67 of the frame and has fixed thereon a hand crank 68 by means of which the shaft may be rotated to rock shaft 62 through an angle of 180° and thus either lower the ground wheels 59 into transporting engagement with the ground, as shown in full lines in Figs. 1 and 7, or to raise the wheels to the broken line position indicated at 69 (Fig. 7) for lowering the frame into engagement with the ground, and thus firmly anchoring the machine in position during operation. In this position, the forward end of the lowered trough is supported by the ground engaging strut 52, as described above.

It is evident from this construction that the invention provides a simple and practical mechanism by which the machine may be either supported on its ground wheels for transportation from point to point, or supported with its frame resting on the ground to firmly support it against shifting of its position. Such lowering of the frame, furthermore, serves to lower the feed trough to adapt it for more conveniently receiving the discharge from a forage rack.

Frame 12 comprises lower side rails 70 of channel shape (Figs. 1 and 4) adapted to slidably receive the inner ends of channel-shaped sides 71 and 72 of a draw bar, indicated generally at 73. Each channel 70 is preferably provided with a keeper strap 74 and a stop lug 75 against which the ends of the draw bar channels may be stopped and in such position a pin or bolt 76 may be removably inserted through aligned openings in the frame and draw bar channels to securely fasten the same together. On removal of the pins 76, however, the draw bar may be moved to an out-of-the-way position. The machine may be transported by connection of a tractor with its draw bar, with the feed trough in either raised or lowered position, as circumstances may require.

If so desired, a molasses pump 77 may be mounted on an end of the frame (Figs. 1, 2 and 3), with its drive shaft extending above sprocket chain 22 and equipped with a sprocket wheel 78 for engagement with the chain, for operation automatically during the operation of the conveyor, for supplying molasses to the crop, as well understood in the art.

Means are also provided for conveniently starting and stopping the operation of the conveyor and pump by supplying shaft 19 with an outer section 79 (Fig. 2), rotating concentrically with shaft 19 and adapted to be connected therewith by a clutch shoe 80 slidable longitudinally on shaft section 79 and provided with a toothed end for clutching engagement with a similarly formed end on the main section of shaft 19. Clutch shoe 80 is engaged by a shipper lever 81, pivoted at its rear end on the frame in rear of shaft 19 and having its forward end pivotally connected at 82 with the center of a link 83. One end of link 83 is pivoted at 84 to one end of a link 85 and pivoted at its other end on the frame. The other end of link 83 is pivotally connected with a link 86 pivotally connected at its forward end with a hand lever 87. Lever 87 is fixed on a rock shaft 88 mounted on the forward wall 67 of the frame and the opposite end of the shaft carries a similar handle 89, for conveniently operating the clutch from either side of the machine. It is evident from this arrangement that as either of levers 87 or 89 is pulled outwardly, link 83 is pivoted on the end of link 81 so as to form with link 85 a toggle which is thereby straightened to move the outer end of lever 81 inwardly and engage the clutch. Inward movement of the handles disengages the clutch to stop the operation of the conveyor and the pump.

It is apparent from the above description that the invention provides a crop blower having a feed trough pivoted at its inner end on fixed bearings on the frame, concentric with the conveyor drive shaft, to swing between upright and lowered positions, and having its weight effectively counterbalanced by accurately compensated spring means, so that the trough may be easily and quickly moved by hand from one position to another without disturbing its conveyor mechanism and without any frictional resistance to the conveyor drive. At the same time, the strut support 52 for the outer end of the trough is automatically moved to and from operating position by the movements of the trough. The convenience of this arrangement is increased by the provision of means for readily raising the ground wheels to lower the machine into anchoring contact with the ground, thereby further lowering the trough to better position for receiving the forage from the racks. The operation of the conveyor and molasses pump is conveniently controlled by operation of the levers 87 and 89 from either side of the machine and the draw bar may be easily detached and disposed in an out-of-the-way position when the feed trough is to be retracted to its upright position to permit the passage of the feed racks. These advantages are afforded by the simple, practical and inexpensive construction of the machine described above.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A crop blower comprising a frame, a feed trough, means movably mounting the inner end of said trough on said frame for swinging said trough between a lowered crop receiving position and an upright retracted position, a spring connected to said trough for counterbalancing the weight of said trough, a flexible element connecting said spring and frame, and a support on said frame for deflecting said element to progressively vary the tension of said spring as said trough is swung from one to another of said positions, to compensate for the varying torque component of the weight of said trough in the different positions thereof.

2. A crop blower comprising a frame, a feed trough, means movably mounting the inner end of said trough on said frame for swinging said trough between a lowered crop receiving position and an upright retracted position, flexible means comprising a spring connected to said trough for counterbalancing the weight thereof, a curved support on said frame for deflecting said flexible means to progressively vary the tension of said spring as said trough is swung from one to another of said positions, to compensate for the varying torque component of the weight of said trough in the different position thereof.

3. A crop blower comprising a frame, a feed trough, means pivotally mounting the inner end of said trough on said frame for swinging movement of said trough between a lower crop receiving position and an upright retracted position, a tension spring having one end connected to said trough, a flexible element connecting the other end of said spring to said frame, and a curved support on said frame for progressively deflecting the line of said element as said trough is moved between said positions thereof to compensate for the varying torque force thereof about said mounting means in the different positions thereof on said frame.

4. A crop blower comprising a frame, a feed trough, a conveyor in said trough, a shaft on said frame having means for moving said conveyor, means mounting the inner end of said trough on said frame independently of said shaft for swinging movement of said trough concentrically with said shaft between a lowered crop receiving position and an upright retracted position, spring means for counterbalancing the weight of said trough, and compensating means for progressively varying the tension of said spring means as said trough is swung from one to another of said positions thereof.

5. A crop blower comprising a frame, a feed trough, a conveyor in said trough, shaft bearings on said frame, a shaft rotatably supported in said bearings and having means for moving said conveyor, trough bearings on said frame concentrically surrounding said shaft in spaced relation therewith, means for mounting the inner end of said trough on said trough bearings for swinging movement of said trough between a lowered corp receiving position and an upright retracted position, spring means for counterbalancing the weight of said trough, and compensating means for progressively varying the tension of said spring means as said trough is swung from one to another of said positions thereof.

6. A crop blower comprising a frame, a feed trough, means movably mounting the inner end of said trough on said frame for swinging movement of said trough between a lowered crop receiving position and an upright retracted position, a tension spring for counterbalancing the weight of said trough, a ground engaging strut pivoted on the outer end of said trough for supporting the same, and a connection between said spring and strut for swinging said strut to position for supporting said trough as said trough is lowered to crop receiving position.

7. A crop blower comprising a frame, a feed trough, means movably mounting the inner end of said trough on said frame for swinging movement of said trough between a lowered crop receiving position and an upright retracted position, a tension spring for counterbalancing the weight of said trough, compensating means for progressively varying the tension of said spring as said trough is swung from one to another of said positions thereof, a ground engaging strut pivotally mounted on the outer end of said trough for supporting the same, and a connection between said strut and spring for swinging said strut to position to support said trough in the lowered position thereof.

References Cited in the file of this patent

UNITED STATES PATENTS

| Number | Name | Date |
|---|---|---|
| 651,333 | Anderson | June 12, 1900 |
| 1,490,404 | Ronning et al. | Apr. 15, 1924 |
| 1,896,293 | Downie | Feb. 7, 1933 |
| 2,129,320 | Geairus | Sept. 6, 1938 |
| 2,180,838 | Saiberlich | Nov. 21, 1939 |
| 2,324,042 | Swenson | July 13, 1943 |
| 2,355,956 | Dakan | Aug. 15, 1944 |
| 2,373,169 | Coultas et al. | Apr. 10, 1945 |
| 2,486,577 | Stoddard | Nov. 1, 1949 |

FOREIGN PATENTS

| Number | Country | Date |
|---|---|---|
| 24,710 | Netherlands | Aug. 15, 1931 |